No. 762,278.

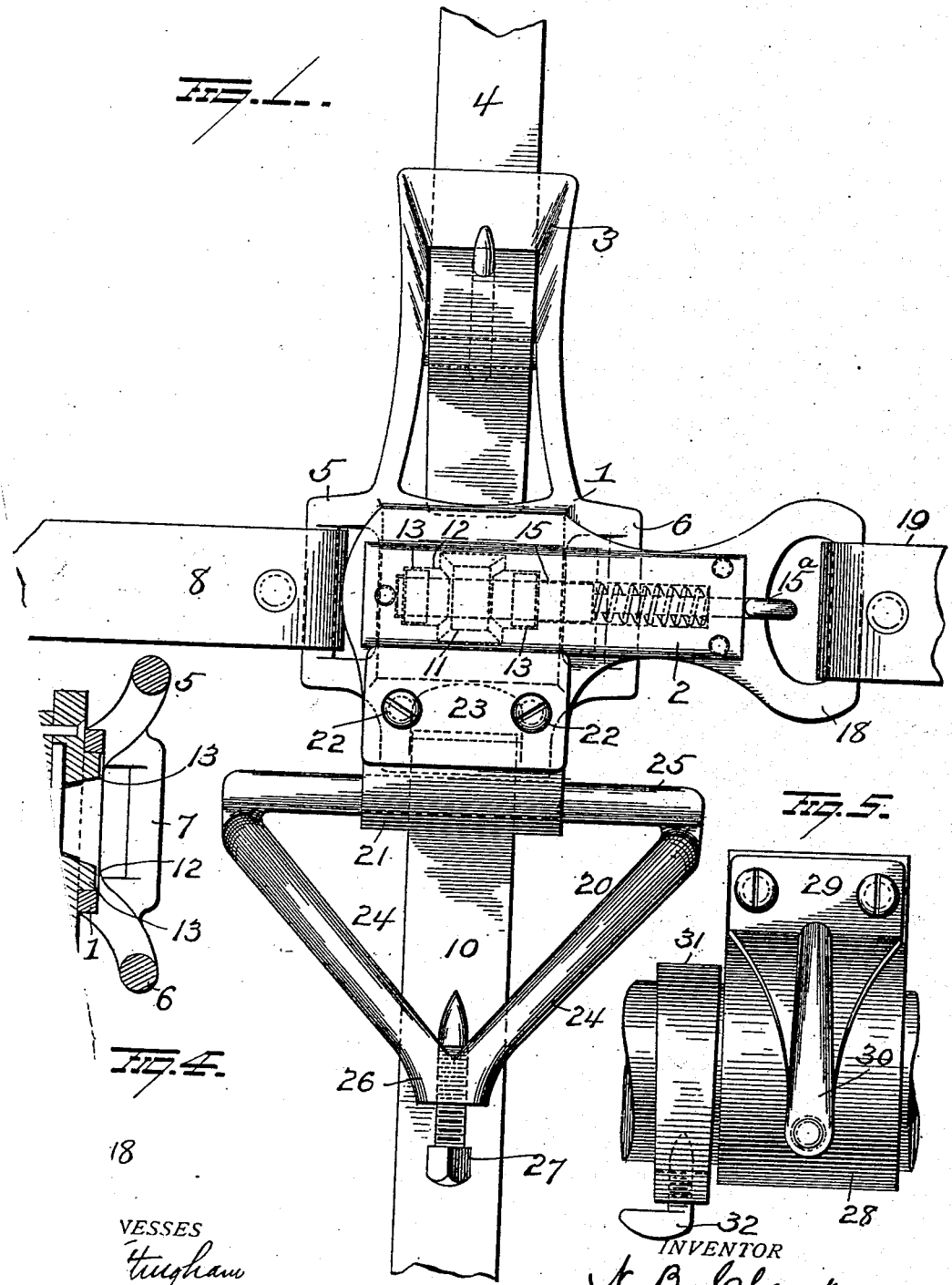

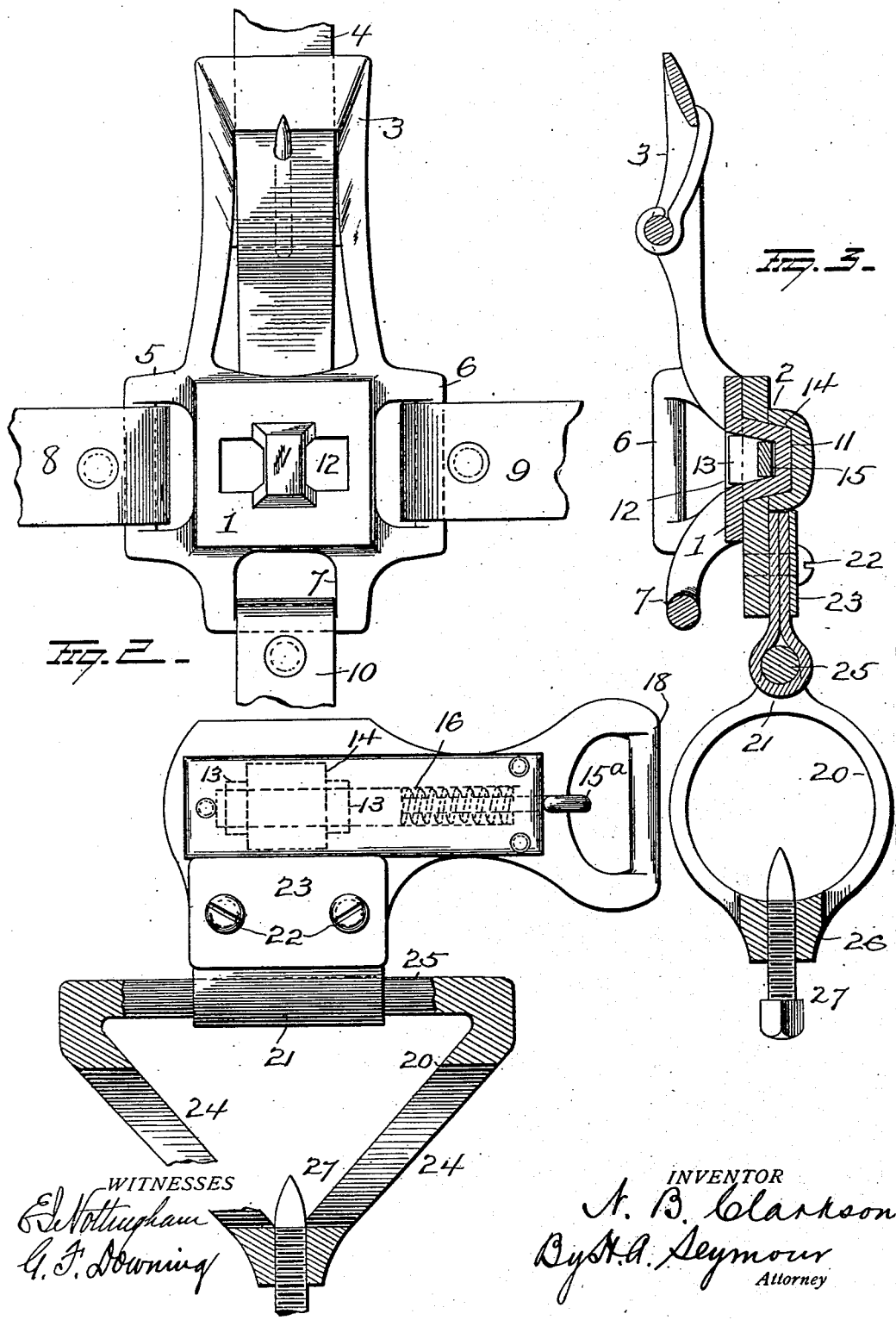

Patented June 14, 1904.

UNITED STATES PATENT OFFICE.

NATHANIEL B. CLARKSON, OF BLACKSBURG, SOUTH CAROLINA, ASSIGNOR OF ONE-HALF TO AUGUSTUS B. BLAKELY, OF CLINTON, SOUTH CAROLINA.

ATTACHING AND DETACHING DEVICE.

SPECIFICATION forming part of Letters Patent No. 762,278, dated June 14, 1904.

Application filed March 12, 1903. Serial No. 147,464. (No model.)

*To all whom it may concern:*

Be it known that I, NATHANIEL B. CLARKSON, a resident of Blacksburg, in the county of Cherokee and State of South Carolina, have invented certain new and useful Improvements in Attaching and Detaching Devices; and I do hereby declare the following to be a full, clear, and exact description of the invention, such as will enable others skilled in the art to which it appertains to make and use the same.

My invention relates to improvements in attaching and detaching devices for draft-animals from vehicles to which they may be harnessed, the object of the invention being to provide improved mechanism for connecting the traces and shaft-supports with the harness proper which will permit of their ready disconnection to free the draft-animal and enable the driver to support the shafts, preventing them from suddenly dropping to the ground to bring the vehicle to a quick stop, and thereby throw the occupants from the vehicle.

With this object in view the invention consists in certain novel features of construction and combinations and arrangements of parts, as will be more fully hereinafter described, and pointed out in the claims.

In the accompanying drawings, Figure 1 is a view in elevation, illustrating my improvements. Fig. 2 is a view illustrating the parts detached and separated. Figs. 3 and 4 are views in section, taken at right angles to each other; and Fig. 5 is a view illustrating a modified form of shaft-support.

My improvements comprise two principal members 1 and 2. The member 1 has provided at its top a buckle 3 to receive the saddle-strap 4, and loops 5, 6, and 7 are made on the other three sides of the member 1 for the attachment of the hame-tug 8, back-strap 9, and belly-band 10, and thus locate the member 1 in proper position.

The body portion of member 1 comprises a flat plate having a beveled or inclined outwardly-projecting hollow lug 11, straddling an elongated slot 12 therein, to receive lugs 13 on the member 2. This member 2 has an inclined pocket 14 between its lugs 13 for the reception of lug 11 on member 1, and a sliding spring-pressed locking-pin 15 is mounted in an elongated bearing or housing 16 in member 2 and extends across this pocket 14, so as to pass through the hollow lug 11 and securely lock the members together. The outer or rear end of this pin 15 has an eye 15$^a$, to which a cord or rope 17 is secured, and extends along the shaft or trace and is supported on the vehicle in convenient reach of the operator to permit him to release the animal without leaving the vehicle.

The rear end of member 2 has a loop 18, to which the trace 19 is secured, and my improved shaft-support 20 is connected to member 2 by a strap 21, secured in place by means of screws or rivets 22, passed through a plate 23, strap 21, and said member 2. This shaft-support comprises a metal casting consisting of two inclined loops 24 to receive the shaft and connected at their upper ends by a bar 25, around which strap 21 is passed before being secured to member 2. The loops are connected at their lower converging ends by a block 26, having a screw-threaded opening therein to receive a set-screw 27, whose function is to screw against or into the shaft and securely lock the shaft-support against movement. Instead of providing this metallic shaft-support I might employ the support shown in Fig. 5. In this form of my invention I provide a leather strap 28, looped as shown and secured to member 2 by screws or rivets passed through a plate 29, having a curved reinforcing-arm 30 through the ends of the strap and the member 2. This arm 30 is secured at its lower end to the side of the loop formed by strap 28, and to prevent sliding movement of the loop on the shaft I secure on the shaft a ring 31 by means of a set-screw 32.

In operation it will be seen that as lug 11 is locked in pocket 14 by the pin 15 and lugs 13 are in the slot 12 of member 1 the parts are securely locked together, but can be readily disconnected by pulling cord or rope 17 to withdraw pin 15 from lug 11, when the animal is detached from the shafts and free to run, while the driver can support the shafts by means of cords 17 and guide the vehicle out of danger.

While I have only shown and described one of these connecting and disconnecting devices, it is of course to be understood that they are employed at both sides of the harness and the parts slightly reversed to perform the necessary results.

Various changes might be made in the general form and arrangements of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. An attaching and detaching device comprising two members, a locking device normally uniting them and adapted to permit their ready separation, devices on one member for attachment of straps of the harness, a trace-loop on the other member, a rigid shaft-support comprising two loops and a rod connecting them, a flexible strap looped about said rod, and means for securing said flexible strap to the member having the trace-loop.

2. An attaching and detaching device, comprising two members, one member to be permanently attached to the harness proper, a trace-loop and a shaft-support permanently attached to the other member, said shaft-support comprising a metal casting having two inclined loops to receive the shaft, said loops integral with each other at one end, a rod or bar connecting the separated ends of the loops, a strap connecting said rod or bar to the last-mentioned member, and a single set-screw at the meeting point of the two inclined loops to engage the shaft.

In testimony whereof I have signed this specification in the presence of two subscribing witnesses.

NATHANIEL B. CLARKSON.

Witnesses:
W. A. JACKINS,
J. R. HEALAN.